United States Patent [19]

Atoji et al.

[11] 4,335,407
[45] Jun. 15, 1982

[54] SHARPNESS EMPHASIZING METHOD AND MACHINE USED IN A PICTURE REPRODUCING MACHINE

[75] Inventors: Hitomi Atoji, Kyoto; Masuo Kunisawa, Uji; Atsuro Hirata, Kyoto; Yasuaki Araki, Kyoto, all of Japan

[73] Assignee: Dainippon Screen Seizo Kabushiki Kaisha, Tenjin-kitamachi, Japan

[21] Appl. No.: 145,443

[22] Filed: May 1, 1980

[30] Foreign Application Priority Data

May 2, 1979 [JP] Japan .................................. 54-53507

[51] Int. Cl.³ .............................................. H04N 1/40
[52] U.S. Cl. ................................................. 358/284
[58] Field of Search ................... 358/75, 80, 162, 280, 358/282, 284

[56] References Cited

U.S. PATENT DOCUMENTS 2,962,548 11/1960 Taudt .................................. 358/284

Primary Examiner—Joseph A. Orsino, Jr.
Attorney, Agent, or Firm—Michael A. Painter

[57] ABSTRACT

A sharpness emphasizing method and machine used in a picture reproducing machine such as a color separator, wherein a sharpness emphasizing signal is prepared from a main signal and an unsharp signal, which are obtained by scanning an original picture, in a sharpness emphasizing signal circuit, wherein a corrected sharpness emphasizing signal is selectively produced from the sharpness emphasizing signal depending on the leap of the unsharp signal in a sharpness emphasizing component pickup circuit, and wherein the corrected sharpness emphasizing signal is added to the main signal in a composer circuit, thereby obtaining a picture signal whose sharpness is emphasized in its detail portions.

10 Claims, 5 Drawing Figures

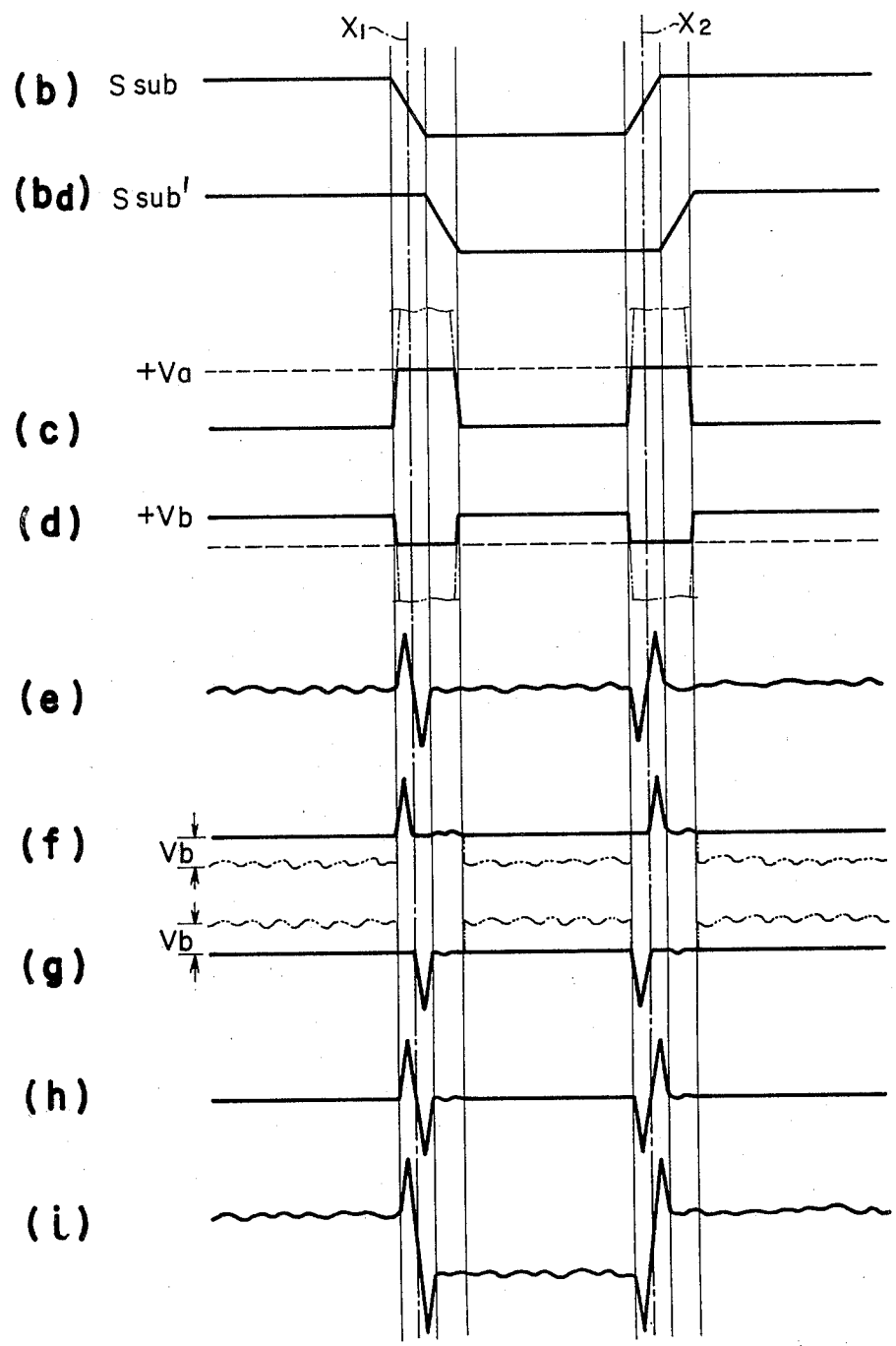

SHARPNESS EMPHASIZING METHOD AND MACHINE USED IN A PICTURE REPRODUCING MACHINE

BACKGROUND OF THE INVENTION

This invention relates to a sharpness emphasizing method and device used in a picture reproducing machine such as an electronic color separator, for example, a color scanner, a color facsimile, and a color CRT monitor.

In a conventional picture reproducing machine such as an electronic color separator, in order to improve its resolving power or sharpness for reproducing a reproduction picture, an electro-optical unsharp masking or differential masking, or an electronic crisping or peaking has been utilized.

Such methods can improve the resolving power or sharpness to reproduce a sharp or clear reproduction picture. However, these methods have a disadvantage, that is, in these methods, the entire surface of the picture, even a flat portion having little or no detail, is equally improved to be emphasized, and consequently the particles of the original picture are emphasized, resulting in a course reproduction picture.

Recently, in the color separator, a small size film such as a 35 mm size film, is often enlarged up to twenty times in order to reproduce a reproduction picture. In this case, in order to maintain the sharpness of the original picture, the size of a main aperture for obtaining a main signal is reduced depending on the magnification desired of the reproduction picture. Hence, in general, the aperture size is determined approximately to 10 micron.

On the other hand, the size of the particles of the original color picture film is approximately 10 micron, which means that the particles of about 10 micron are distributed even in the flat portion of the original picture film.

Accordingly, when the original picture film is scanned, the level of the main signal obtained is varied by the particles. Further, when the main signal is amplified in a sharpness emphasizing circuit in the color separator, the sharpness emphasizing circuit having a large amplification factor emphasizes the particles of the picture film, with the result of a rough reproduction picture even in the flat portion.

In order to remove such particle influences, conventionally a sharpness emphasizing signal is sliced at a certain fixed slice level, and the uniformly sliced levels of the sharpness emphasizing signal are added to the main signal to emphasize the detail portions of the original picture. However, according to this conventional method, the large detail portions can be sufficiently emphasized, but no small detail portions whose levels are less than the certain slice level, are emphasized at all.

SUMMARY OF THE INVENTION

It is an object of the present invention to provide a sharpness emphasizing method used in a picture reproducing machine, free from the aforementioned defects, which is capable of reproducing a faithful reproduction picture, and which is stable and reliable.

It is another object of the present invention to provide a sharpness emphasizing device used in a picture reproducing machine, free from the aforementioned defects, which is capable of reproducing a faithful reproduction picture, and which is stable and reliable.

According to the present invention there is provided a sharpness emphasizing method used in a picture reproducing machine wherein an original picture is photoelectrically scanned to produce a main signal and an unsharp signal, comprising the steps of obtaining a sharpness emphasizing signal by processing the main signal with the unsharp signal, obtaining a slice signal, from the unsharp signal, which suppresses the sharpness emphasizing signal except when the unsharp signal makes a leap of a predetermined magnitude, selectively suppressing the sharpness emphasizing signal to produce a corrected sharpness emphasizing signal, and adding the corrected sharpness emphasizing signal to the main signal to emphasize the sharpness thereof.

According to the present invention there is also provided a sharpness emphasizing device used in a picture reproducing machine wherein an original picture is photoelectrically scanned to produce a main signal and an unsharp signal, comprising a sharpness emphasizing circuit which comprises a sharpness emphasizing signal from the main signal and the unsharp signal, a slice signal circuit for producing a slice signal, from the unsharp signal, which suppresses the sharpness emphasizing signal except for when the unsharp signal makes a leap of a predetermined magnitude, a slicing circuit for selectively suppressing the sharpness emphasizing signal to produce a corrected sharpness emphasizing signal, and a composer circuit for adding the corrected sharpness emphasizing signal to the main signal to emphasize the sharpness thereof.

BRIEF DESCRIPTION OF DRAWINGS

In order that the present invention may be better understood, a preferred embodiment will now be described with reference to the accompanying drawings, in which:

FIG. 5 shows various signals appeared in the sharpness emphasizing device in FIG. 4.

DESCRIPTION OF A PREFERRED EMBODIMENT

Figure 1:
FIG. 1 shows main and supplemental apertures for obtaining main and unsharp signals used in a sharpness emphasizing method according to the present invention.
Figure 1:
Figure 2:
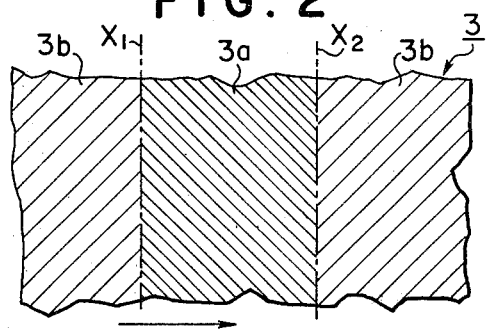
FIG. 2 is an enlarged fragmentary elevation view of an original picture to be scanned according to the present invention.
Figure 3:
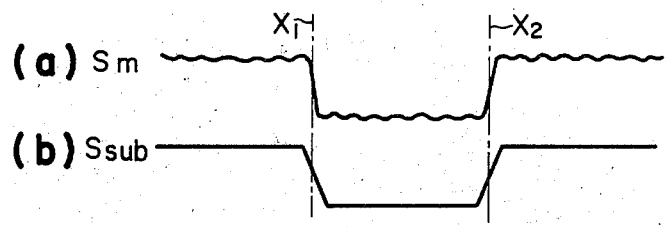
FIG. 3 shows the main and the unsharp signals obtained through the main and the supplemental apertures in FIG. 1.

Referring now to the drawings, there are shown in FIG. 1 main and supplemental apertures 1 and 2, the latter 2 having an opening area of several times as large as the former 1. When an original picture 3 having a dark portion 3a in its center and light portions 3b in its sides, shown in FIG. 2, is scanned through the two apertures 1 and 2 in the right hand side direction in FIG. 2, thereby obtaining a main signal Sm and an unsharp signal Ssub, as shown in FIG. 3. In FIGS. 2 and 3, $X_1$ and $X_2$ indicate the borders between the dark and the light portions 3a and 3b of the original picture 3.

The level of the main signal Sm is varied a little even in the flat portion having no detail except the borders $X_1$ and $X_2$ having details since the opening size of the main aperture 1 is approximately the same as that of the particles of the picture film 3, as shown in FIG. 3a.

The unsharp signal Ssub is little affected by the particles of the picture 3 because the opening size of the supplemental aperture 2 is larger than that of the particles of the picture 3, and thus the variation of the level of the unsharp signal Ssub is almost flat in the flat portion having no detail, except in the borders $X_1$ and $X_2$ having the details, wherein it varies more moderate than the main signal Sm, as shown in FIG. 3b.

Figure 4:
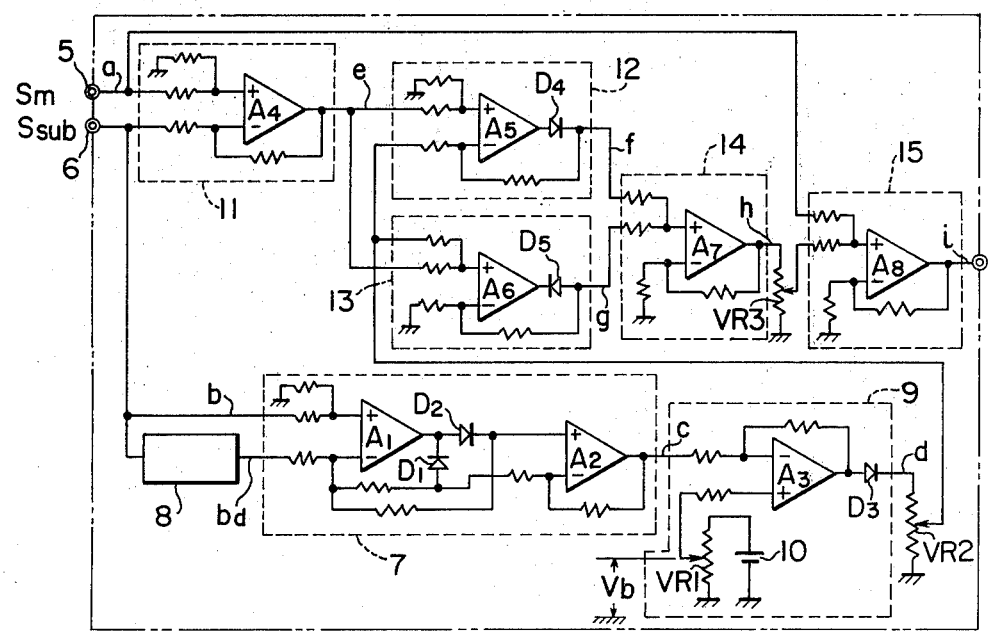
FIG. 4 shows a sharpness emphasizing device used in a sharpness emphasizing method of the present invention.

In FIG. 4, there is shown a sharpness emphasizing device of the present invention. The main signal Sm and the unsharp signal Ssub are fed to terminals 5 and 6 of the sharpness emphasizing device.

The sharpness emphasizing device comprises a differential absolute value circuit 7 of a conventional type comprising two amplifiers A1 and A2 and two diodes D1 and D2 connected therebetween; a delay circuit 8; a slice level setup circuit 9 comprising an amplifier A3, an electric source 10 connected to the positive terminal thereof via a variable resistor VR1, and a diode D3; a subtractor circuit 11 comprising an amplifier A4; a positive half-wave rectifier circuit 12 comprising an amplifier A5 and a diode D4 connected thereto; a negative half-wave rectifier circuit 13 comprising an amplifier A6 and a diode D5 connected thereto; an adder circuit 14 comprising an amplifier A7; and an adder circuit 15 comprising an amplifier A8. The amplifiers used in this embodiment are operational amplifiers.

The unsharp signal Ssub shown in FIG. 5b, which is the same signal as shown in FIG. 3b, is sent from the terminal 6 to the positive input terminal a of the amplifier A1 in the differential absolute value circuit 7, and to the delay circuit 8. The unsharp signal delayed in the delay circuit 8 is then sent to the negative terminal bd of the amplifier A1. The delayed unsharp signal Ssub' is shown in FIG. 5bd. The differential absolute value circuit 7 carries out subtraction between the two unsharp signals Ssub and Ssub' and outputs a signal corresponding to the absolute value of the difference between the two unsharp signals Ssub and Ssub'.

When the gains of the two amplifiers A1 and A2 of the differential absolute value circuit 7 are set to be high enough, the output signal shown in FIG. 5c is obtained at the output line c of the circuit 7. In FIG. 5c, Va denotes a saturated output level of the circuit 7.

The output signal in FIG. 5c of the circuit 7 is sent to the negative terminal of the amplifier A3 of the slice level setup circuit 9. The circuit 9 outputs a signal of a predetermined voltage Vb set by the variable resistor VR1 when the output signal of the circuit is smaller than the voltage Vb, or a nought signal when the output signal of the circuit 7 is larger than the voltage Vb. A slice signal at the output line d of the circuit 9 is shown in FIG. 5d.

The main signal Sm at the terminal 5 and the unsharp signal Ssub at the terminal 6 are fed to the positive and the negative terminals of the amplifier A4 of the subtractor circuit 11 which carries out a subtraction between the two signals input and outputs an unsharp masking signal shown in FIG. 5e at its output line e. This unsharp masking signal is a kind of a sharpness emphasizing signal.

The level of the unsharp masking signal of the circuit 11 is minutely irregular even in the flat portions having no detail, as clearly shown in FIG. 5e. Hence, if the unsharp masking signal is directly added to the main signal Sm, the particle influences are increased, as described above.

In order to overcome this problem, in this case, the unsharp masking signal is divided into positive and negative components, each being sliced by using the slice signal in FIG. 5d in order to remove the small level variations of the main signal, such as in its flat portions due to the particles of the original picture. That is, the unsharp masking signal of FIG. 5e is sent to the positive terminals of the amplifiers A5 and A6 in the positive and the negative half-wave rectifier circuits 12 and 13, and the slice signal of FIG. 5d is fed to the negative terminal of the amplifier A5 and the positive terminal of the amplifier A6 through a variable resistor VR2 which adjusts the output level of the slice signal.

Each positive or negative component of the unsharp masking signal of FIG. 5e is sliced by the slice signal of FIG. 5d, thereby obtaining a positive or negative component signal shown in FIG. 5f or 5g in the output line f or g of the positive or the negative half-wave rectifier circuit 12 or 13. The two positive and negative components signals in FIGS. 5f and 5g are sent to the positive terminal of the amplifier A7 of the adder circuit 14 which adds the two component signals and outputs a corrected unsharp masking signal shown in FIG. 5h in its output line h.

The corrected unsharp masking signal of FIG. 5h, which is also a kind of a sharpness emphasizing signal, is fed to the positive terminal of the amplifier A8 of the adder circuit 15 through a variable resistor VR3, together with the main signal Sm. The variable resistor VR3 adjusts the output level of the corrected unsharp masking signal of FIG. 5h. The circuit 15 adds the two signals therein and outputs a picture signal whose sharpness is emphasized, shown in FIG. 5i in its output line i. The resulted picture signal is sent to a picture reproducing machine (not shown) in order to reproduce a clear or sharp reproduction picture.

In this embodiment, although the unsharp signal is obtained by using the supplemental aperture 2 having a larger opening diameter than that of the main aperture 1, however, the unsharp signal may be prepared from the light through the main aperture without using the supplemental aperture, for example, by picking up the light with the optical system for picking up light put out of focus.

According to the present invention, the sharpness emphasizing effect may be controlled by using the slice signal, for instance, when the leap of the variations of the unsharp signal is small, the gain of an unsharp masking circuit or a peaking circuit is reduced by the slice signal, or the slice level of the slice signal is so increased as to reduce the sharpness emphasizing effect, or when the leap of the variations of the unsharp signal is large enough, this control is not done. In this embodiment, the adder circuit 14 may be controlled by the slice signal so as to vary the level of the corrected unsharp masking signal of FIG. 5h.

When the sharpness emphasizing of the picture signals is carried out by peaking or crisping, the present invention may be applied so as to emphasize the sharpness only in detail portions, excluding flat portions having little or no detail.

Although the present invention has been described in terms of a preferred embodiment, various changes and modifications can be made by those skilled in the art without departing from the present invention.

What is claimed is:

1. A sharpness emphasizing method used in a picture reproducing machine wherein an original picture is photoelectrically scanned to produce a main signal and an unsharp signal, comprising the steps of:
   (a) obtaining a sharpness emphasizing signal by subtracting the unsharp signal from said main signal;
   (b) obtaining a slice signal, from the unsharp signal by determining the difference between the unsharp signal with a certain delay and the unsharp signal without any delay, said slice signal suppressing the sharpness emphasizing signal except for when the unsharp signal makes a leap of a predetermined magnitude;
   (c) selectively suppressing the sharpness emphasizing signal to produce a corrected sharpness emphasizing signal; and
   (d) adding the corrected sharpness emphasizing signal to the main signal to emphasize the sharpness thereof.

2. A sharpness emphasizing method according to claim 1 wherein the suppression of sharpness emphasis is made to depend on the magnitude of the leap of the unsharp signal.

3. A sharpness emphasizing method according to claim 2 wherein, in order to eliminate minute irregularities in flat portions of the main signal resulting from the particles of photosensitive material in the original picture or other sources and to prevent their sharpness from being emphasized, the slice signal of a positive voltage level is added to the sharpness emphasizing signal, the sum thereof being rectified to produce a negative half of the corrected sharpness emphasizing signal while the same slice signal is subtracted from the sharpness emphasizing signal, the difference being rectified to produce a positive half of the corrected sharpness emphasizing signal, and, thereafter, the positive and negative half of the corrected sharpness emphasizing signal are combined to produce the whole corrected sharpness emphasizing signal.

4. A sharpness emphasizing method according to claim 3 wherein the voltage level of the slice signal is selected in accordance with the magnitude of the leap of the unsharp signal.

5. A sharpness emphasizing method according to claim 4 wherein the magnitude of the sharpness emphasizing signal is determined in dependence upon the magnitude of the leap of the unsharp signal.

6. A sharpness emphasizing device used in a picture reproducing machine wherein an original picture is photoelectrically scanned to produce a main signal and an unsharp signal, comprising:
   (a) a sharpness emphasizing circuit which composes a sharpness emphasizing signal and the unsharp signal by subtracting the unsharp signal from the main signal;
   (b) a slice signal circuit for producing a slice signal responsive to the difference between the unsharp signal with a certain delay and the unsharp signal without any delay, said slice signal suppressing the sharpness emphasizing signal except for when the unsharp signal makes a leap of a predetermined magnitude;
   (c) a slicing circuit for selectively suppressing the sharpness emphasizing signal to produce a corrected sharpness emphasizing signal; and
   (d) a composer circuit for adding the corrected sharpness emphasizing signal to the main signal to emphasize the sharpness thereof.

7. A sharpness emphasizing device according to claim 6 wherein the slicing circuit selectively suppresses the sharpness emphasizing signal in dependence upon the magnitude of the leap of the unsharp signal.

8. A sharpness emphasizing device according to claim 7 wherein, in order to eliminate minute irregularities in flat portions of the main signal resulting from particles or photosensitive material in the original picture or other sources and to prevent their sharpness from being emphasized, a differential absolute value circuit is provided which, on one hand, adds the slice signal of a positive voltage level to the sharpness emphasizing signal and then rectifies their sum to produce a negative half of the corrected sharpness emphasizing signal, and, simultaneously, substracts the same slice signal from the sharpness emphasizing signal and then rectifies the difference to produce a positive half of the corrected sharpness emphasizing signal, thereby composing the entire corrected sharpness emphasizing signal from the positive and the negative half of the corrected sharpness emphasizing signal.

9. A sharpness emphasizing device according to claim 8 wherein the slice signal circuit is capable of varying the voltage level of the slice signal in dependence upon the magnitude of the leap of the unsharp signal.

10. A sharpness emphasizing device according to claim 9 wherein the magnitude of the sharpness emphasizing signal is determined in dependence upon the magnitude of the leap of the unsharp signal.

* * * * *